United States Patent [19]
Davis et al.

[11] Patent Number: 5,573,343
[45] Date of Patent: Nov. 12, 1996

[54] HYDROSTATIC RELEASE DEVICE

[75] Inventors: Paul D. Davis; Thomas S. Floate, both of Southampton, United Kingdom

[73] Assignee: Simon Cash-Read, Chalvington, United Kingdom

[21] Appl. No.: 418,003

[22] Filed: Apr. 6, 1995

[30] Foreign Application Priority Data

Apr. 7, 1994 [GB] United Kingdom ............... 9406886

[51] Int. Cl.[6] ................ B63B 22/14; B63B 23/70
[52] U.S. Cl. ................ 403/31; 403/2; 403/322; 114/367; 441/10
[58] Field of Search ........................ 403/322, 321, 403/31, 2; 441/7, 9, 10; 114/367, 379

[56] References Cited

U.S. PATENT DOCUMENTS

| | | | |
|---|---|---|---|
| 2,824,315 | 2/1958 | McKenny | 114/367 |
| 2,994,892 | 8/1961 | Paradis | 441/10 |
| 4,065,823 | 1/1978 | Lorenzen et al. | 441/10 |
| 4,833,760 | 5/1989 | Sundstrom | 403/31 X |
| 4,902,156 | 2/1990 | Deisler et al. | 403/31 X |
| 5,365,873 | 11/1994 | Wigram | 114/367 |

FOREIGN PATENT DOCUMENTS

598601  5/1994  European Pat. Off. .

*Primary Examiner*—Anthony Knight
*Attorney, Agent, or Firm*—Lahive & Cockfield

[57] ABSTRACT

The application describes a hydrostatic release device, suitable for releasing life-saving equipment carried on a ship or aircraft when the ship or aircraft sinks or ditches in the sea. A change in ambient pressure is detected by a pressure sensor which opens a liquid-filled chamber and thereby releases a hydrostatic pressure behind a reciprocable member. This reciprocable member then allows release of a release means. The release means can comprise a link prevented from longitudinal movement by an abutment and normally constrained against lateral movement by the reciprocable member. Thus removal of the reciprocable member away from the link enables transverse movement of the link clear of the fixed abutment. Such an arrangement provides a particularly simple and inexpensive release means.

13 Claims, 6 Drawing Sheets

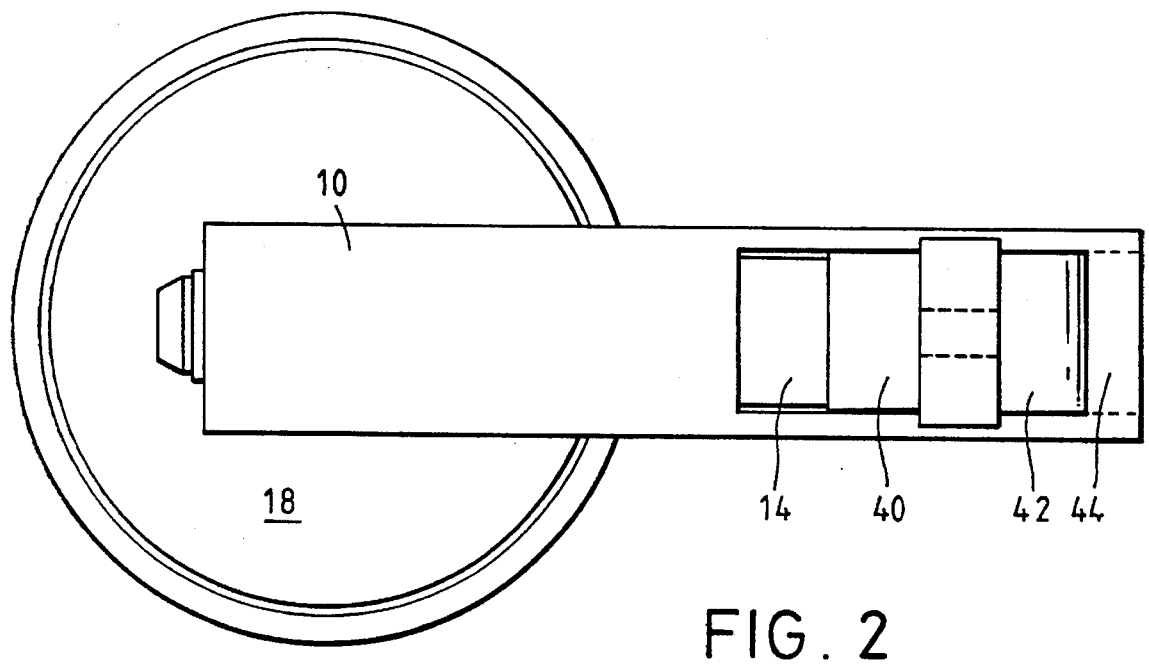
FIG. 2
FIG. 3
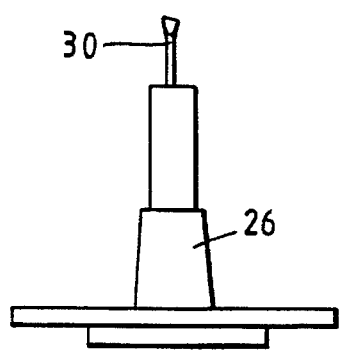

FIG. 7
FIG. 8
FIG. 9
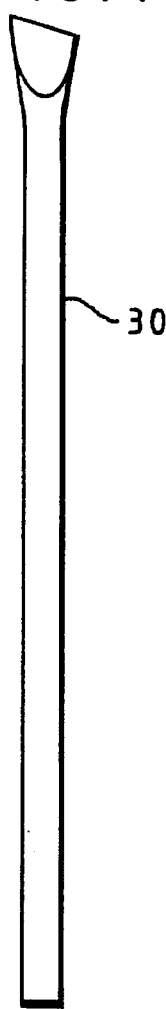
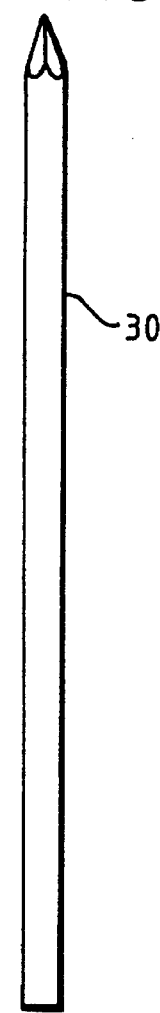
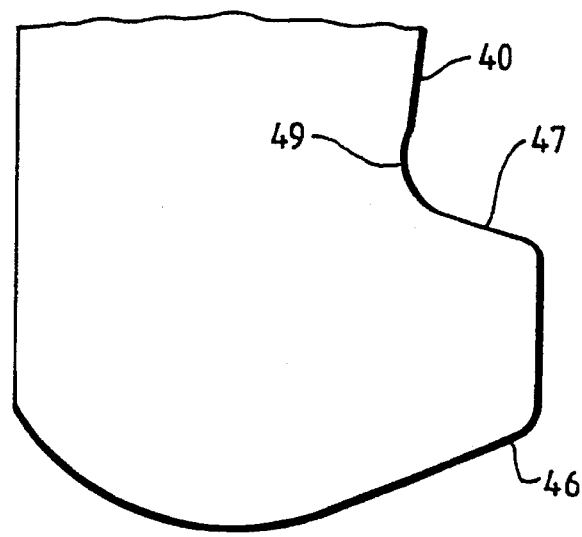

HYDROSTATIC RELEASE DEVICE

BACKGROUND OF THE INVENTION

The present invention relates to a hydrostatic release device, that is a device which will respond to a change in ambient pressure to free a release member or link. A particular use of such a device is to release life-saving equipment carried on a ship or aircraft when the ship sinks or the aircraft ditches in the sea. As the ship or aircraft sinks, there will be a change in ambient pressure due to the entry into the water and at a certain predetermined depth the device will respond by releasing equipment.

The equipment may, for instance, comprise a dinghy or an emergency beacon or a radio signalling buoy which may include position signal indicators, etc. The nature of the equipment is not of great relevance to the present invention.

Hydrostatic release devices as such are known but these are generally complex and/or expensive. The present invention therefore seeks to provide an inexpensive release device with few moving parts which will be reliable and trouble-free in use. This is particularly important in the context of an item of safety equipment which will generally only be used once with little or no opportunity for testing.

SUMMARY OF THE INVENTION

According to the present invention, there is provided a release device comprising a reciprocable member having at one end a piston head contacting liquid in a liquid-filled chamber, and at the other end bearing against a release means thereby to prevent operation thereof;

the liquid filled chamber including a normally closed opening;

the device having a pressure sensor adapted on detecting a predetermined pressure to open the opening thereby to release liquid from the liquid-filled chamber, allow movement of the reciprocable member, and allow operation of the release means.

The normally closed opening of the liquid-filled chamber can be a valve opened by a reaction to a predetermined pressure, for example a Schrader-type valve. Preferably, however, it comprises a frangible part, and the pressure sensor is associated with a piercing device, such that when the pressure sensor detects a predetermined pressure it urges the piercing device into the frangible part, thereby to rupture that part and hence open the opening.

In the context of ships, boats, etc., the release device will generally be arranged to operate at a predetermined depth of water. A suitable such depth is between 1.5 and 4 meters, though this is a matter of preference. Clearly, devices adapted to operate at greater depths are less likely to suffer accidental triggering, but provide a greater delay before release of the device and in shallow water may well never the release the device.

The pressure sensor can be a fluid-filled diaphragm, so that expansion or contraction of the diaphragm by a predetermined amount provides a signal that the predetermined pressure has been reached.

Preferably, the release means comprises a link prevented from longitudinal movement by a fixed abutment and constrained against lateral movement by the reciprocable member. Thus, movement of the reciprocable member away from the link enables transverse movement of the link clear of the fixed abutment. Such an arrangement provides a particularly simple and inexpensive release means.

The release means can comprise a pair of such links, each having abutments thereon, the abutments either bearing against a fixed part on the release device or against each other. Alternatively, the release means can comprise, in sequence, a fixed abutment surface, a first link extending longitudinally in a first direction, abutting the abutment surface and having a projection projected away from the abutment surface to define a transverse ledge, a roller resting in the ledge, a second link extending in a longitudinal direction opposed to the longitudinal direction of the first link and also having a projection, projecting towards the abutment surface thereby to define a second ledge in which the roller also sits, wherein the reciprocable member normally bears against the surface of the second link thereby to urge it towards the first link and prevent longitudinal movement of either link. By this latter arrangement, the relative simplicity of the device can be maintained while providing a very positive release as soon as the opening is opened.

In use, the release link may for example be attached to a strap which passes over a life-raft or dinghy, the other end of the strap being bolted to the deck of a ship so that when the device operates the release link allows the strap to go freely and the dinghy can then float away from the ship.

BRIEF DESCRIPTION OF THE DRAWINGS

An embodiment of the present invention will now be described by way of example, with reference to the accompanying drawings, in which:

FIG. 2 is a view from above of the device of FIG. 1;

FIG. 3 is a side elevation of the piercing device or spike and its mounting;

FIGS. 7 and 8 are, respectively, edge and side views of a preferred form of piercing spike; and FIG. 9 is a sectional view of a preferred release link profile.

DETAIL DESCRIPTION OF THE PREFERRED EMBODIMENT

Figure 1:
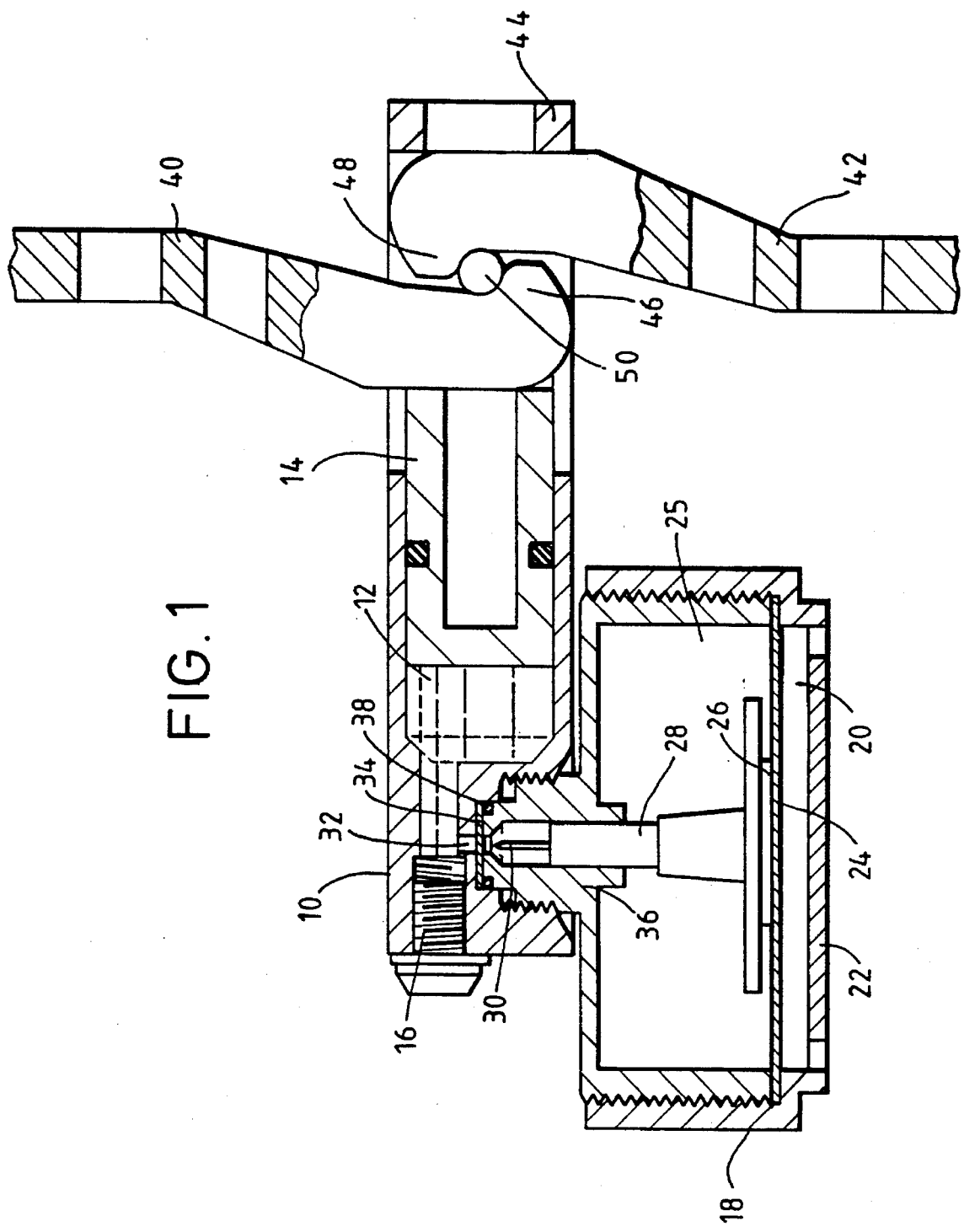
FIG. 1 is a sectional view from the side of a release device according to the present invention.

The release device shown in FIGS. 1 to 4 comprises a main body 10 in which is formed a liquid filled chamber 12 containing a piston 14. A suitable liquid for chamber 12 is hydraulic oil. The chamber 12 is sealed by plug 16, removable to allow filling of the liquid.

A diaphragm housing 18 is attached to one wall of the main body 10. The housing 18 includes a chamber 20 which is open to the atmosphere via a perforated cap 22, and a diaphragm 24 which closes this chamber 20. Behind the diaphragm 24 is a sealed internal chamber 25 attached to the diaphragm 24 is a plunger 26 which supports a spike 30 (see FIG. 3 particularly). The tip of the spike is fluted or otherwise formed so as to rupture, rather than pierce and subsequently plug. A suitable shape is illustrated in FIGS. 7 and 8. The blade portion of the spike 30 has a taper of about 40° in profile (FIG. 8), and is wider than the body of the spike in plan (FIG. 7). Furthermore, the cutting tip is not exactly transverse to the axis of the spike 30 but is inclined by about 10° to about 30° to allow easier cutting,. Each of these features independently enhance the rupturing effect of the spike 30.

The chamber 12 has an opening 32 sealed by an "O" ring and a frangible disc 34. The opening 32 faces the spike 30, and the disc is held in place by being sandwiched between the body 10 and sealing ring formation 36 for housing 18.

The diaphragm housing 18 is sealed against the body 10 via an O-ring 38.

Thus, variations in the ambient pressure round the unit will be transmitted to one surface of the diaphragm 24 via the perforated cap 22, and increasing pressures will cause the spike 30 to be urged towards the frangible disc 34.

The piston 14 is, in its usual position, pressed by the pressure of fluid behind it pressed against the rear surface of a first release link 40. This is in turn pressed against the front surface of a second release link 42, which is in turn pressed against a fixed abutment 44 on the body 10. Thus, the two release links 40, 42 are sandwiched between the fixed abutment 44 and the moveable piston 14. At their front surfaces, facing each other the two release links 40, 42 each have a projection 46, 48 which are offset relative to each other to define a channel therebetween. In the channel sits a roller 50. The points of contact of the respective projections 46, 48 with the roller 50 are deliberately not aligned. This causes a turning movement to be applied to the roller 50 when the links 40, 42 are pulled apart and aids separation.

The edge faces of the projections 46, 48 are inclined so as to provide a wider base than tip. Thus, in the absence of the piston 14, the links 40, 42 are inherently unstable when subject to a separation force. A particularly preferred section for the projections 46, 48 is that illustrated in FIG. 9. The contact edge 47 of the projection 46 is inclined at about 15°, plus or minus a few degrees, preferably plus or minus 1°. At the foot of the projection 46 is a slight rounded depression 49 which will accept the roller 50. All edges are rounded to help motion of the roller 50.

In normal use, the release links cannot move transversely to the piston axis due to the projections 46, 48 interfering via the roller 50 in one direction and shoulders interferring with the body 10 in the other direction. They cannot move parallel to the piston axis due to being sandwiched as mentioned above.

If the device is subject to an ambient pressure higher than a predetermined maximum, the diaphragm will flex sufficient to force the spike 30 through the frangible disc 34, thus opening the fluid-filled chamber to the internal chamber 25. The pressure behind the piston 14 will then be released, allowing it to move backward in its bore and releasing the release links 40, 42. The roller 50 provides a low friction release for the links 40, 42 in conjunction with the instability of the links (see above).

Figure 4:
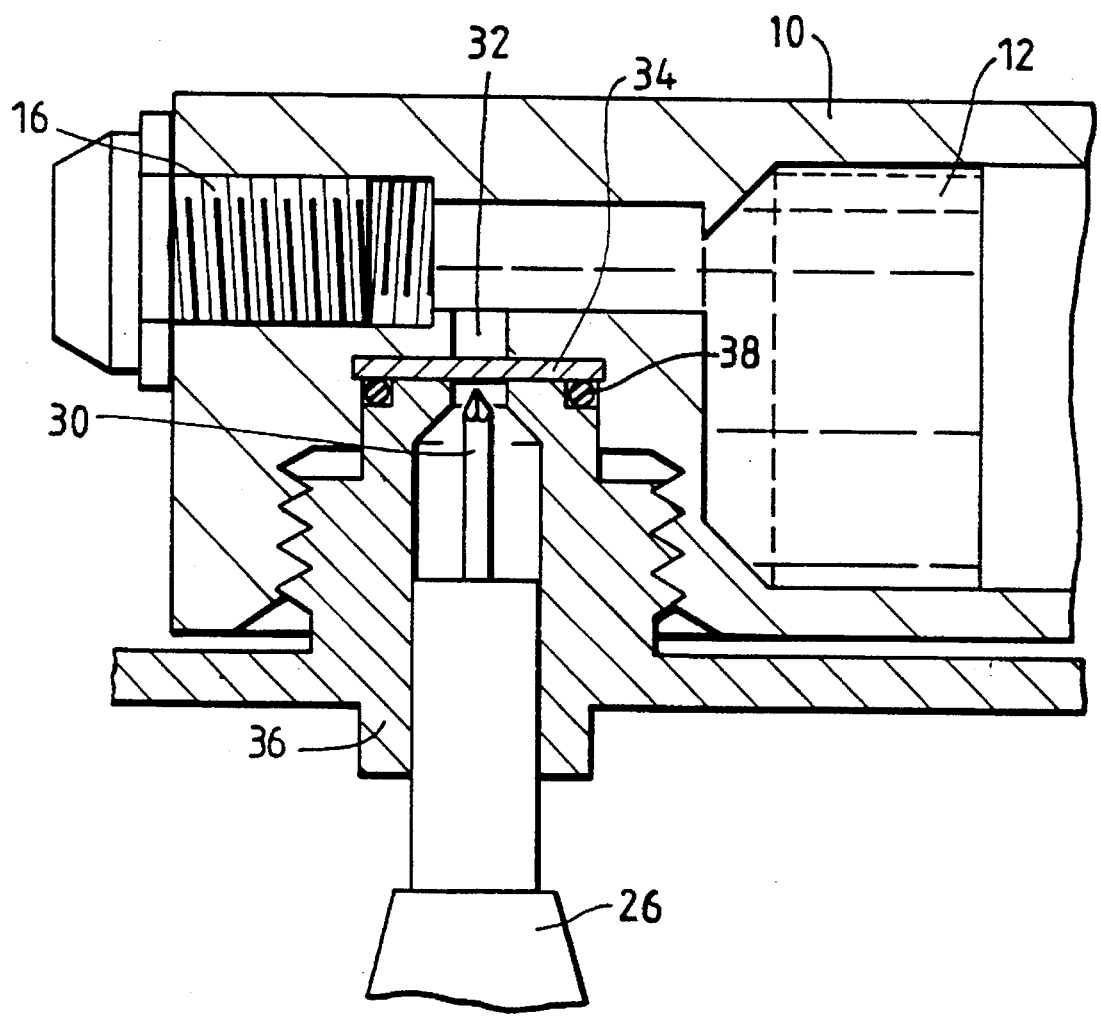
FIG. 4 is a an enlarged sectional view of FIG. 1 showing the piercing device and disc in more detail.

FIG. 4 shows in more detail the area of the frangible disc 34, and it can be seen that this disc 34 is sandwiched between opposing parts of the body 10 and diaphragm housing 18.

Figure 5:
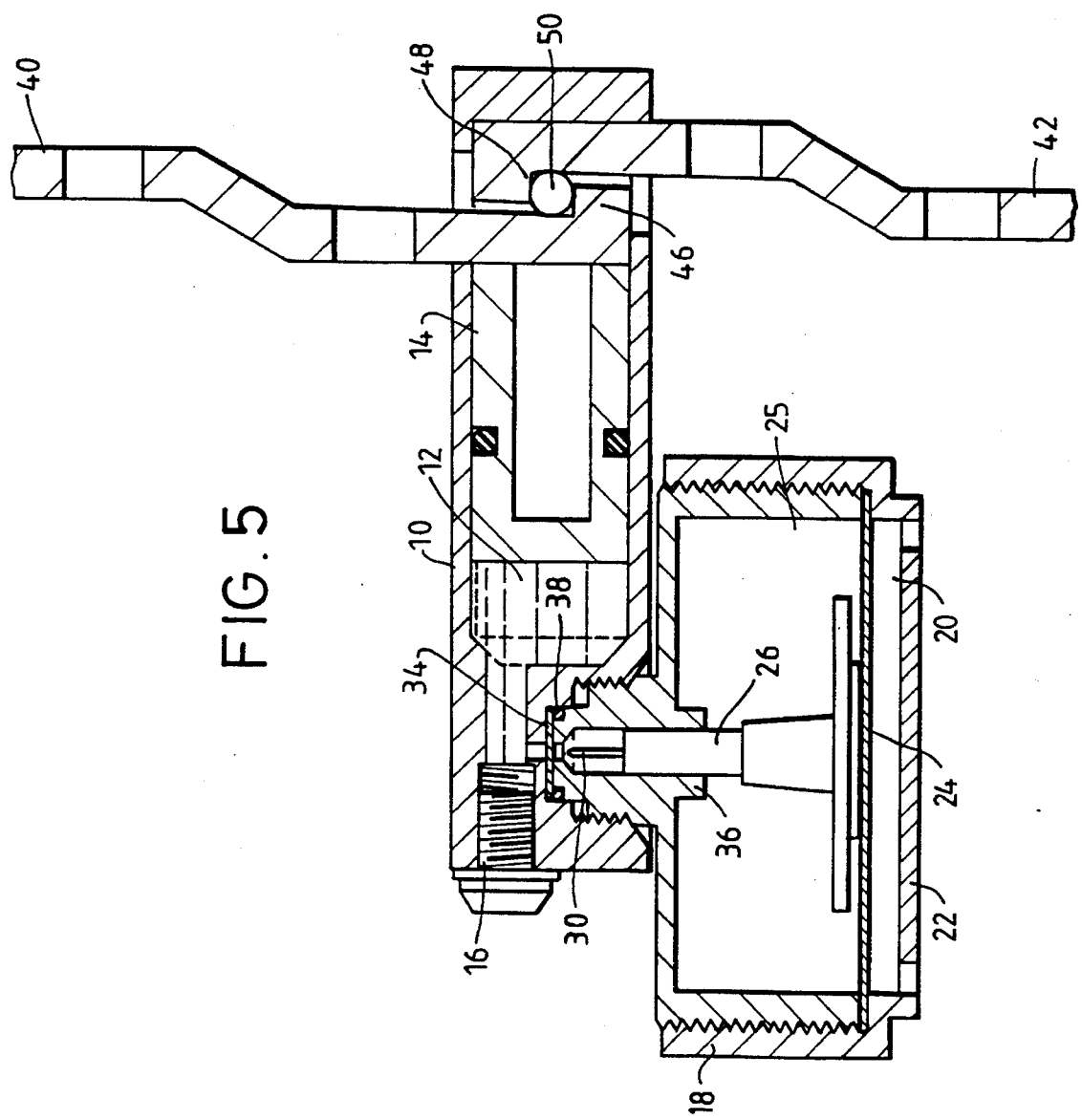
FIG. 5 is a sectional view through an alternative form of the device.

FIG. 5 shows a slightly different form of device, but one which shares many features with that illustrated in FIGS. 1 to 4. In FIG. 5, like reference numerals have been used to denote like parts. A distinct diaphragm 24 is provided which acts on a separate but moveable spike support. In addition, the precise design of the release links 40, 42 differs.

Figure 6:
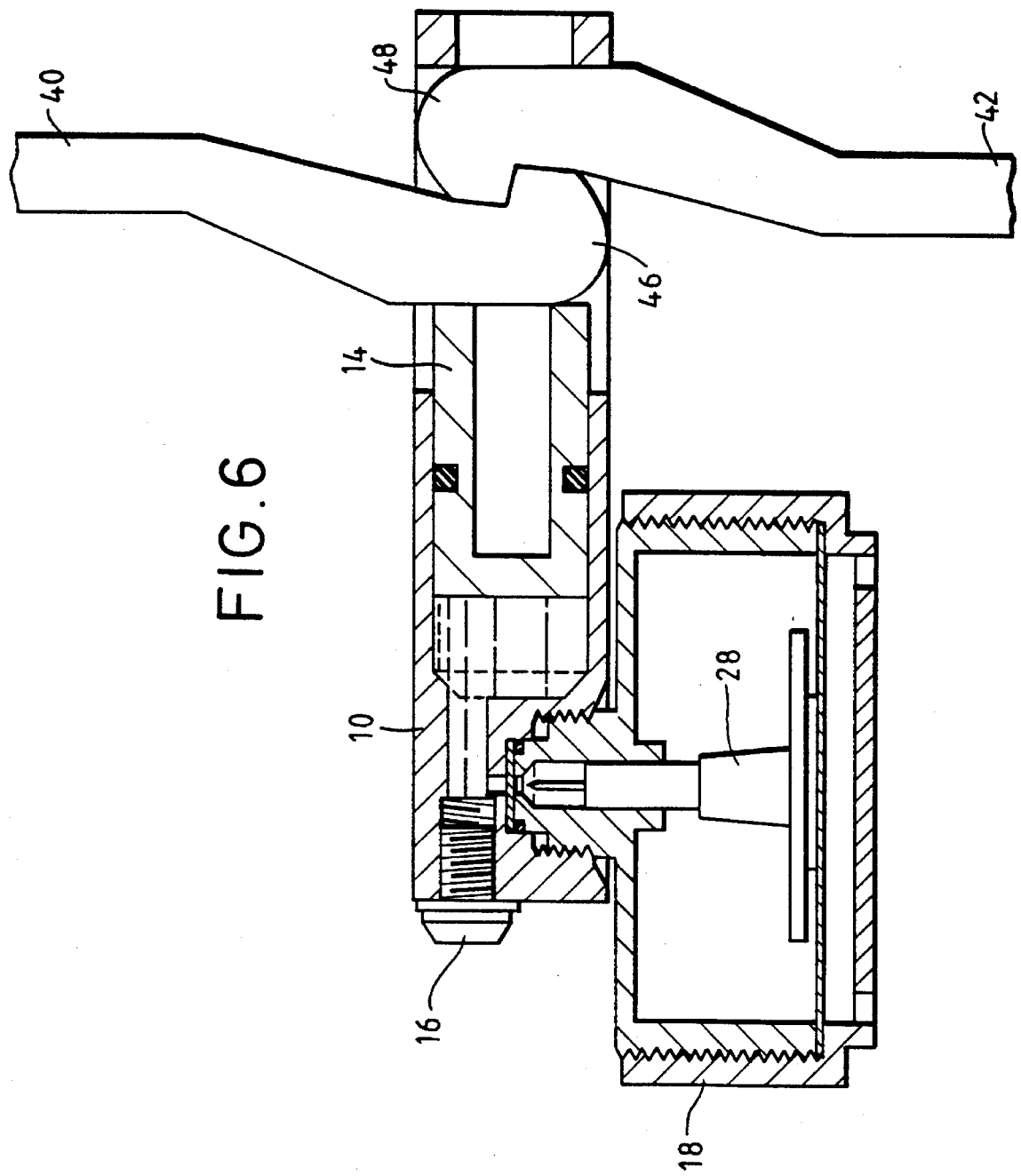
FIG. 6 is a part sectional view of a further alternative form of the device.

FIG. 6 shows a further alternative design, similar to that of FIG. 1. However, the roller 50 between the projections 46, 48 of the release links 40, 42 is omitted in favour of simple inter-engagement of the projections 46, 48. It is however believed that the embodiment of FIG. 1 gives a swifter and more positive release of the links 40, 42.

The embodiments of FIG. 5 and FIG. 6 operate in an identical fashion to that of FIGS. 1 to 4.

Instead of using a disc and piercing device, a valve may be located in the chamber wall and the movement of the diaphragm may be employed to open the valve thus achieving the same effect as is achieved by piercing the disc.

The main body parts are all preferably made of a plastics material, such as acetal or a 40% glass filled PBT. The spike is preferably of 20 g stainless steel piano wire. The oil in the chamber 11 can be teltus oil. The plunger 26 is preferably of acetal or other low friction material of sufficient mechanical strength.

The diaphragm 24 is preferably of un-reinforced silicone and the frangible disc 34 may be a polyimide. The roller 50 is preferably of a hardened stainless steel. The release links 40, 42 and the body 10 are preferably of anodised aluminium.

The piston 14 can be provided with a groove in which sits an O ring seal of a suitable elastomer, for example as shown in FIG. 6. The surface of the piston 14 can be coated with a low friction material, e.g. PTFE or in an anodising process. Reducing the sliding friction of the piston within the bore is highly beneficial since this reduces the force necessary to release the links 40, 42.

It will be appreciated by those skilled in the art that the above described embodiments are purely illustrative of the present invention and that many variations and modifications could be made to those embodiments without departing from the scope of the present invention. In particular, it will be a simple matter of re-design to expose the rear surface of the diaphragm 24 to ambient pressure and the front surface to a sealed space equivalent to region 25 and thus make the illustrated example responsive to a decreasing pressure.

We claim:

1. A release device comprising a reciprocable member, a chamber containing liquid, a release element, and a pressure sensor, the reciprocable member having at one end thereof a piston head contacting the liquid in the chamber and at the other end a surface bearing against the release element to prevent operation thereof; the liquid filled chamber including a normally closed opening; the pressure sensor being adapted on detecting a predetermined pressure to open the normally closed opening thereby to release liquid from the liquid-filled chamber, allow movement of the reciprocable member, and allow operation of the release element.

2. A release device according to claim 1 wherein the normally closed opening of the liquid-filled chamber comprises a frangible part, the pressure sensor being associated with a piercing device and adapted on detecting the predetermined pressure to urge the piercing device toward the frangible part, thereby to rupture that part and hence open the opening.

3. A release device according to claim 1 wherein the normally closed opening comprises a valve opened by a reaction of the pressure sensor to the predetermined pressure.

4. A release device according to claim 3 wherein the valve is a schrader type valve.

5. A released device according to claim 1 wherein the pressure sensor responds to an increase in ambient pressure.

6. A release device according to claim 1 wherein the predetermined pressure corresponds to a depth of water between 1.5 and 4 meters.

7. A release device according to claim 1 wherein the pressure sensor comprises a fluid-filled diaphragm.

8. A release device according to claim 1 wherein the release element comprises a link prevented from longitudinal movement by an abutment and constrained against lateral movement by the reciprocable member; movement of the reciprocable member away from the link enabling lateral movement of the link for moving clear of the abutment.

9. A release device according to claim 1 wherein the release element comprises a pair of links and a fixed abutment surface, the pair of links each having projections thereon, the projections bearing against each other, thereby to prevent longitudinal movement of either link, and at least one link being constrained against lateral movement by the reciprocable member.

10. A release device according to claim 1 wherein the release element comprises, in sequence, a fixed abutment surface; a first link extending longitudinally in a first direction, which first link abuts the fixed abutment surface and has a projection projected away from the fixed abutment surface to define a transverse ledge; a roller resting in the ledge; a second link extending in a longitudinal direction opposed to the longitudinal direction of the first link and also having a projection which projects towards the fixed abutment surface thereby to define a second ledge in which the roller also sits; the reciprocable member normally bearing against a surface of the second link thereby to urge it toward the first link and prevent longitudinal movement of either link.

11. A release device according to claim 8 wherein the abutment has an inclined side surface to aid disengagement.

12. A release device according to claim 9 wherein at least one abutment includes an inclined side surface to aid disengagement.

13. A release device according to claim 10 wherein the abutment has an inclined side surface to aid disengagement.

* * * * *